United States Patent [19]
Foster et al.

[11] Patent Number: 6,037,563
[45] Date of Patent: Mar. 14, 2000

[54] PROTECTIVE GAS SHROUD FOR WELDING

[75] Inventors: Michael F. Foster, Carson City; Thomas E. Knowles, Dayton; Kevin Updegrove; Christopher A. Thurston, both of Carson City, all of Nev.

[73] Assignee: Chromalloy Gas Turbine Corporation, San Antonio, Tex.

[21] Appl. No.: 09/259,958

[22] Filed: Mar. 1, 1999

[51] Int. Cl.[7] .............................. B23K 26/12; B23K 26/20
[52] U.S. Cl. ................ 219/121.63; 219/74; 219/121.64; 219/121.84; 219/121.86
[58] Field of Search .......................... 219/72, 74, 121.63, 219/121.64, 121.84, 121.86; 228/219

[56] References Cited

U.S. PATENT DOCUMENTS

| | | | |
|---|---|---|---|
| 1,746,191 | 2/1930 | Devers | 219/74 |
| 4,078,167 | 3/1978 | Banas et al. | |
| 4,162,390 | 7/1979 | Kelly | |
| 4,845,331 | 7/1989 | Yeo et al. | 219/72 |
| 4,990,741 | 2/1991 | Moores et al. | 219/121.64 |
| 5,106,010 | 4/1992 | Stueber et al. | |
| 5,170,027 | 12/1992 | Brodersen | 219/72 |
| 5,319,179 | 6/1994 | Joecks et al. | 219/137 R |
| 5,554,837 | 9/1996 | Goodwater et al. | 219/121.63 |
| 5,685,771 | 11/1997 | Kleppen | 219/72 X |

FOREIGN PATENT DOCUMENTS

| | | |
|---|---|---|
| 51-27843 | 3/1976 | Japan . |
| 55-14125 | 1/1980 | Japan . |
| 6-7984 | 1/1994 | Japan . |

*Primary Examiner*—Gregory Mills
*Attorney, Agent, or Firm*—Mitchell D. Bittman

[57] ABSTRACT

A protective gas shroud for welding is provided by: positioning an article into a chamber having an opening at the top to permit welding of the article; introducing argon into the body of the chamber to act as a protective gas shroud for the article during welding; introducing helium into the open top of the chamber to assist in maintaining a protective gas shroud around the article during welding; and welding the article within the protective gas shroud.

15 Claims, 2 Drawing Sheets

PROTECTIVE GAS SHROUD FOR WELDING

BACKGROUND

When performing weld operations on critical components it is often necessary to immerse the part being welded in an inert atmosphere. The inert atmosphere protects the weld from contamination, allowing the creation of extremely clean and defect free fusion bonds. Argon is commonly used as the inert cover gas, since it is heavier than air. It is common practice to place the object being welded in a "purge box", which is a sealed chamber open at the top. Argon is metered into the bottom of the box, and flows out the top. The object to be welded is placed in the box, and is completely immersed in the argon. The open top allows the argon to displace the air by pushing it out from the bottom, and also allows access by the welder.

A type of purge box is used during $CO_2$ laser welding of turbine airfoils as disclosed in U.S. Pat. No. 5,554,837. It is similar to the type described above, except that the "box" is a clear quartz cylinder. The quartz cylinder allows the operator to clearly see the weld process from safety outside the laser enclosure. When performing laser welding with the use of induction coils to preheat the part, the quartz, which is transparent to ultraviolet radiation, allows the use of ultraviolet sensors to control the induction coil preheat temperature.

A problem arises, however, when using argon purge boxes in general and quartz cylinders specifically during laser welding. For any purge box to be effective the part to be welded must be significantly below the edges of the purge chamber. That way the part remains completely immersed in the inert argon atmosphere. It can be difficult to position a part to be welded deep enough in the argon for effective shielding due to the access that is required by the welder; or when laser welding, by interference between the induction coils, powder feed nozzles, and the edges of the actual purge box (or cylinder).

The most common method of solving this problem is to increase the flow of argon in the purge box, and/or add additional argon flow through the weld nozzles. This solution is sufficient in many cases, but not all. significant difficulties arise when performing preheated induction welding. Elevating the part to temperatures in excess of 1200° F. prior to weld creates strong updrafts of the protective cover gas. The heated, rising argon creates turbulence, which can mix air in with the argon and contaminate the weld. The situation is even worse when the part cannot be located much below the edge of the purge box.

SUMMARY

A protective gas shroud for welding is provided by: positioning an article into a chamber having an opening at the top to permit welding of the article; introducing argon into the body of the chamber to act as a protective gas shroud for the article during welding; introducing helium into the open top of the chamber to assist in maintaining a protective gas shroud around the article during welding; and welding the article within the protective gas shroud.

BRIEF DESCRIPTION OF THE DRAWINGS

Other features and advantages of the present invention will become apparent when the following description is read in conjunction with the accompanying drawings in which.

DESCRIPTION

The process and apparatus for providing a protective gas shield is applicable to various welding processes, whether manual or machine controlled. It is particularly applicable to welding processes which preheat the article, as is disclosed in U.S. Pat. Nos. 5,106,010 and 5,554,837, the disclosure of these patents being incorporated by reference. In such processes superalloy articles, eg. turbine components, are preheated to a predetermined temperature, eg. in the range of 1400° F. to 2100° F. A preferred method of preheating such superalloy articles is through use of an induction heat coil. The welding can be carried out by laser welding, eg. a $CO_2$ laser, with the use of a powder alloy feed. To prevent contamination of the weld an inert atmosphere provides a protective gas shroud. The preferred inert atmosphere for welding is argon which may be mixed with other gases such as nitrogen or helium.

Figure 1:
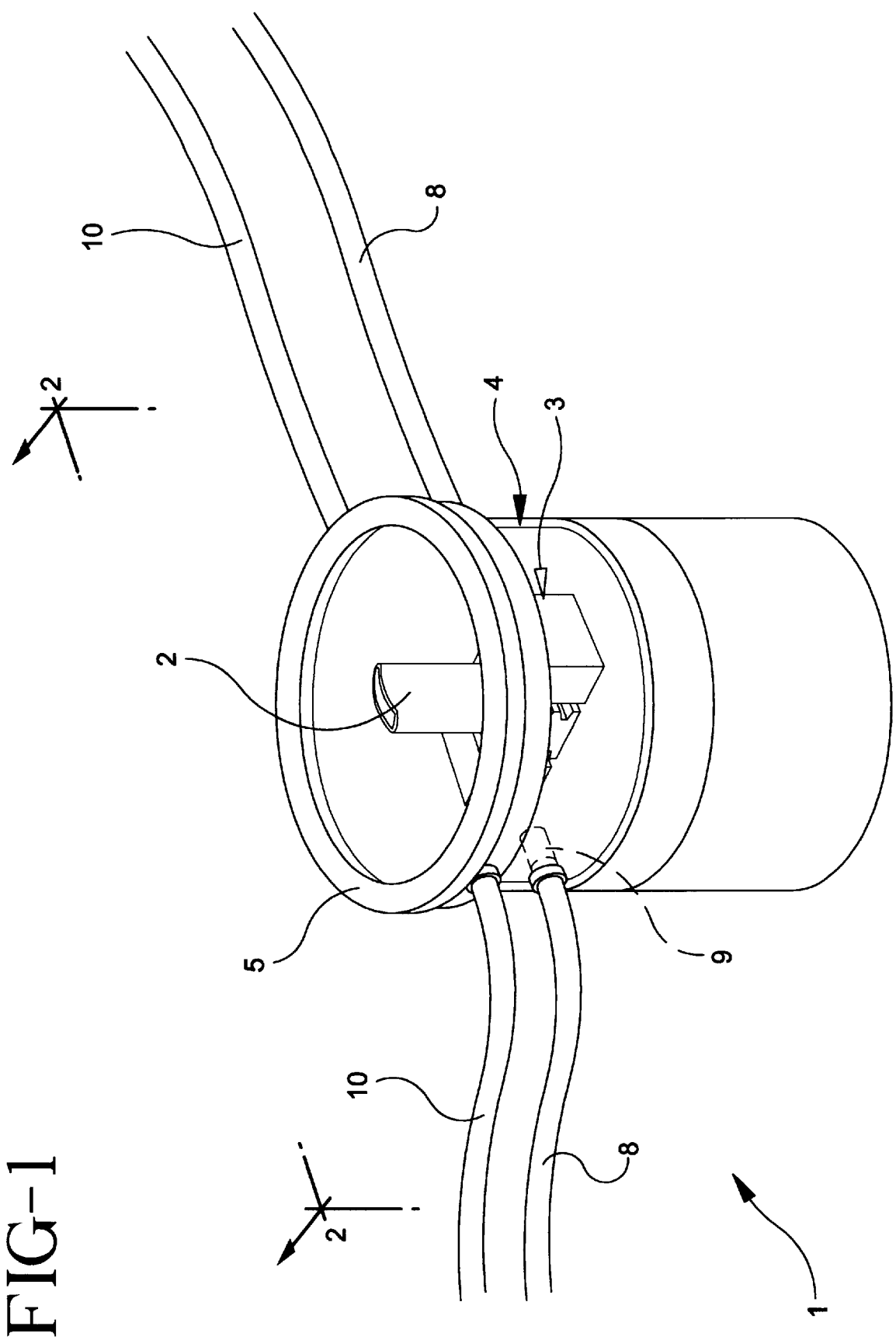
FIG. 1 is a perspective view of an apparatus for shielding an article with a protective gas.
Figure 2:
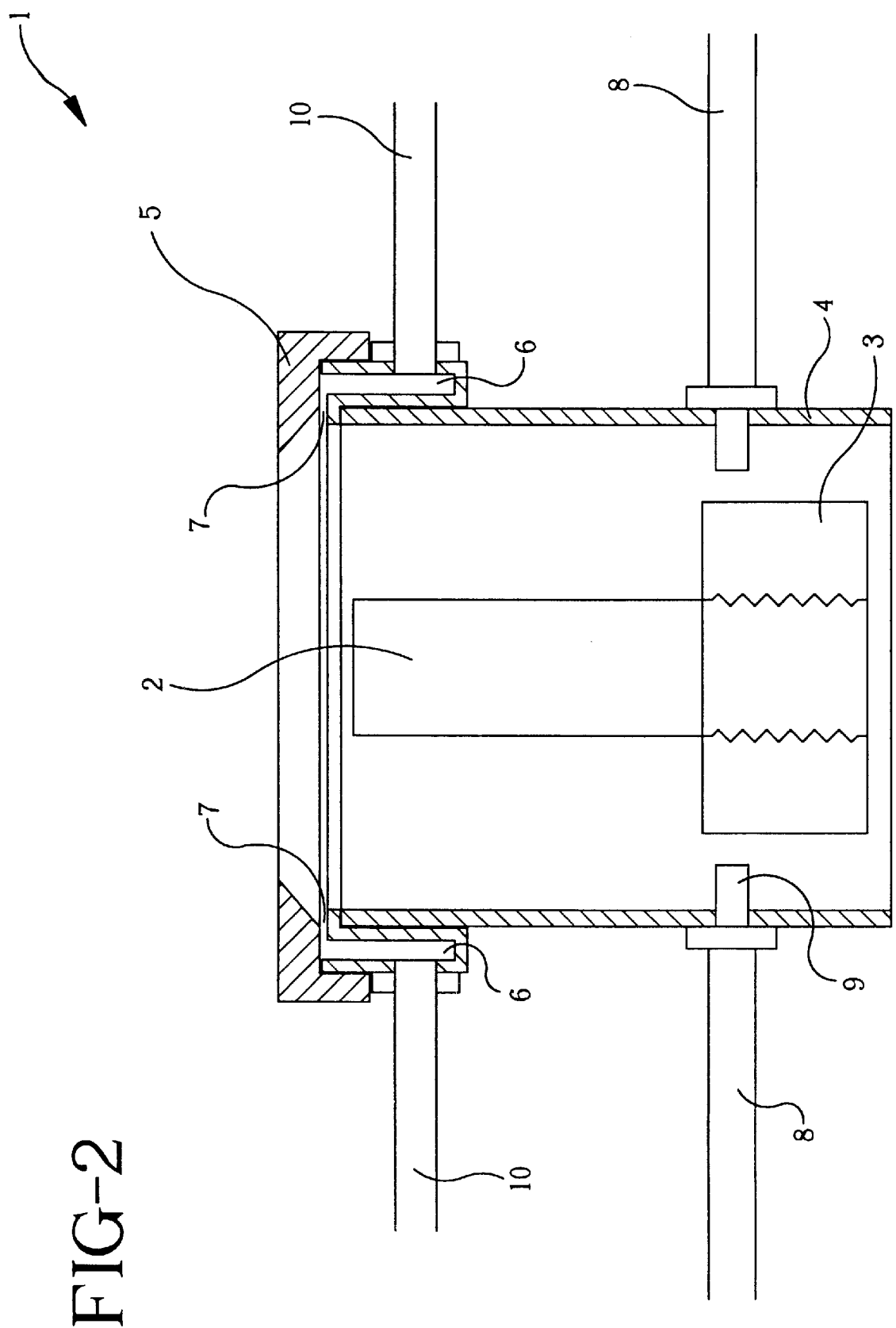
FIG. 2 is a cross sectional view of FIG. 1 along line 2—2.

An innovative shielding process and purge box design 1, as shown in FIG. 1 reduces cover gas contamination problems for an article 2 fixtured 3 therein, particularly when used during preheating procedures. When a quartz cylinder 4 is used as the argon purge chamber, a machined metal ring 5 is fitted around the top circumference of the cylinder. As shown in FIG. 2, the ring 5 is hollow 6, and is machined in such a way that there is a gas slot 7 or passage open around the entire inner edge. The inert gas helium is fed through supply line 10 to the ring 5 during weld operations, while at the same time argon is fed through a gas feed line 8 and gas diffuser 9 into the body of the cylinder. Since helium is lighter than both argon and air, it rises around the cylinder. It acts to trap the column of heated argon, and effectively raise the wall of the quartz cylinder. The basic principal can be applied to conventional argon purge boxes. The rising helium surrounds the argon flowing out the top of the box, creating a raised column of protective inert atmosphere. The turbulence that eventually occurs at the top of the column is sufficiently high that it does not contribute to weld contamination.

EXAMPLE 1

A CFM-56 HPT blade was fixtured in a 6 inch diameter quartz cylinder. The blade was held by the root serrations, with the tip of the blade positioned approximately 0.5 inches below the top edge of the cylinder. The base of the quartz tube formed an airtight seal with the blade fixture. Hose fittings in the base of the fixture allowed introduction of argon cover gas into the cylinder. Around the top of the cylinder was fitted a hollow metal ring, plumbed for helium. Around the complete inner circumference of the metal ring a slot was machined through to the hollow center. An induction coil was located around the blade tip to preheat the blade in preparation for $CO_2$ laser welding. The supplies of argon and helium protective gas were turned on. The induction coil was activated, raising the blade temperature to 1950° F. The blade tip contour was then laser welded using R142 material. After weld the induction coil was turned off. When the blade had cooled the cover gas flows were stopped, and the blade was removed from the quartz cylinder and fixture. Metallurgical evaluation of the blade tip showed no indication of any contamination due to lack of protective atmosphere during the weld process.

EXAMPLE 2

A CF6-80C2 Stage 1 HPT blade was fixtured in a 6 inch diameter quartz cylinder. The blade was held by the root serrations, with the tip of the blade positioned approximately 0.5 inches below the top edge of the cylinder. The base of the quartz tube formed an airtight seal with the blade fixture. Hose fittings in the base of the fixture allowed introduction of argon cover gas into the cylinder. Around the top of the cylinder was fitted a hollow metal ring, plumbed for helium. Around the complete inner circumference of the metal ring a slot was machined through to the hollow center. An induction coil was located around the blade tip to preheat the blade in preparation for $CO_2$ laser welding. The supplies of argon and helium protective gas were turned on. The induction coil was activated, raising the blade temperature to 1550° F. The blade tip contour was then laser welded using R142 material. After weld the induction coil was turned off. When the blade had cooled the cover gas flows were stopped, and the blade was removed from the quartz cylinder and fixture. Metallurgical evaluation of the blade tip showed no indication of any contamination due to lack of protective atmosphere during the weld process.

What is claimed is:

1. A process for shielding an article with a protective gas during welding comprising:

positioning an article into a chamber having an open top and a body to permit welding of the article;

introducing argon into the body of the chamber to act as a protective gas shroud for the article during welding;

introducing helium into the open top of the chamber to assist in maintaining a protective gas shroud around the article during welding; and welding the article within the protective gas shroud.

2. Process of claim 1 wherein the article is preheated to a predetermined temperature for welding.

3. Process of claim 2 wherein the article is welded by laser welding.

4. Process of claim 3 wherein the article is preheated using an induction heat coil.

5. Process of claim 4 wherein the chamber is a cylinder and the helium is introduced around the opening at the top of the cylinder.

6. Process of claim 5 wherein the helium is introduced through a hollow ring fitted around the opening at the top of the cylinder, the ring having a passage on the inside of the ring for the introduction of the helium.

7. Process of claim 6 wherein the ring is metal and the passage on the inside of the ring is a slot.

8. Process of claim 4 wherein the article is a superalloy article.

9. Process of claim 8 wherein the article is preheated to a temperature in the range of 1400° F. to 2100° F.

10. Process of claim 3 wherein the laser welding is carried out with a powder alloy feed.

11. Process of claim 1 wherein the argon is mixed with a gas selected from the group consisting of nitrogen and helium.

12. An apparatus for shielding an article with a protective gas during welding comprising:

a chamber having an open top and a body to permit welding of an article within the chamber;

a means for supplying argon into the body of the chamber; and a means for supplying helium into the open top of the chamber.

13. Apparatus of claim 12 wherein the chamber is a cylinder and the helium is supplied around the opening at the top of the cylinder.

14. Apparatus of claim 13 wherein the helium is supplied through a hollow ring fitted around the opening at the top of the cylinder, the ring having a passage on the inside of the ring for supplying the helium.

15. Apparatus of claim 14 wherein the passage on the inside of the ring is a slot.

* * * * *